United States Patent [19]

Cahill

[11] 4,398,505

[45] Aug. 16, 1983

[54] DIESEL FUEL COMPOSITION

[75] Inventor: Paul J. Cahill, Wheaton, Ill.

[73] Assignee: Standard Oil Company (Indiana), Chicago, Ill.

[21] Appl. No.: 313,799

[22] Filed: Oct. 22, 1981

[51] Int. Cl.$^3$ .......................... F02B 75/12; C10C 1/22
[52] U.S. Cl. ........................................ 123/1 A; 44/57; 44/72
[58] Field of Search ...................... 44/57, 72; 123/1 A

[56] References Cited

U.S. PATENT DOCUMENTS

| | | | |
|---|---|---|---|
| 2,902,984 | 9/1959 | Fox | 123/1 A |
| 3,129,699 | 4/1964 | Millikan | 123/1 A |
| 3,163,677 | 12/1964 | Hoffman et al. | 252/386 |
| 3,334,103 | 8/1967 | Feldman et al. | 252/386 |
| 3,502,692 | 3/1970 | Feldman et al. | 252/386 |
| 3,759,926 | 9/1973 | Chalmers et al. | 252/386 |

FOREIGN PATENT DOCUMENTS 630284  6/1976  U.S.S.R. ................... 44/72

*Primary Examiner*—Charles F. Warren
*Assistant Examiner*—Y. Harris-Smith
*Attorney, Agent, or Firm*—Richard A. Kretchmer; William T. McClain; William H. Magidson

[57] ABSTRACT

N,N-disubstituted organic nitroxides are highly effective ignition improvers for diesel fuels.

20 Claims, No Drawings

DIESEL FUEL COMPOSITION

BACKGROUND OF THE INVENTION

1. Field of the Invention

This invention relates to the use of ignition accelerators to improve the cetane number and ignition properties of diesel fuels. More particularly, it relates to the use of N,N-disubstituted organic nitroxides as additives to increase the cetane number of a liquid hydrocarbon diesel fuel.

2. Description of the Prior Art

During the operation of a diesel engine, there is a delay period between the time of fuel injection and fuel ignition, which is referred to as the ignition delay period. Ignition of the fuel then results in a rapid pressure increase which serves to drive the engine. If the ignition delay period is too long, the subsequent ignition can result in a pressure increase which is too rapid for proper engine operation. Indeed, the pressure increase can become so rapid that severe knock and engine damage can occur. Alternatively, if the ignition delay period is too short, there is inadequate time for the mixing of air and fuel which can result in the formation of smoke.

The ignition delay period is influenced to some degree by engine operating conditions such as injection timing, compression ratio, rate of fuel injection, and inlet air temperature. In addition, the ignition delay period is highly dependent upon the fuel composition. The cetane number of the fuel is a measure of the influence that the fuel exerts on this parameter. In more specific terms, the cetane number of a fuel is a number which is equal to the volume percent of normal cetane in a blend with 1-methylnaphthalene which matches the ignition properties of the fuel. That is to say, a scale is used wherein normal cetane is given a number of 100 and 1-methylnaphthalene is assigned a number of 0.

As a broad generality, aromatic hydrocarbons usually have low cetane numbers while paraffins tend to have high cetane numbers and naphthenes are intermediate between the aromatics and paraffins. Typical refinery streams would commonly be expected to possess cetane numbers in the following ranges: (1) heavy gas oil, 50–55; (2) light gas oil, 44–49; (3) heavy naphtha, 41–46; and (4) cracked gas oil, 17–31. It will be appreciated, of course, that these ranges are merely approximate and are dependent upon the precise chemical composition of the refinery stream.

A satisfactory diesel fuel should ordinarily have a cetane number which is not less than about 40 in order to insure proper ignition in a compression ignition engine. This requirement presents no problem so long as adequate volumes of high cetane number distillates are available. However, the supply of such high cetane number material is relatively inflexible. Therefore, as the demand for diesel fuel continues to increase, a corresponding need exists to incorporate fuels into the diesel pool which have cetane numbers that are too low for satisfactory use in a compression ignition engine. One method of accomplishing this involves the use of additives which serve as ignition promoters and increase the cetane number of the fuel.

A multitude of materials have been proposed in the prior art for use as ignition improvers. Included in the group of materials which have previously been proposed for this purpose are the following: (1) hydrocarbons such as acetylene, divinylacetylene and butadiene; (2) aldehydes, ketones, ethers and alcohols such as furfuraldehyde, acetone, diethyl ether, ethyl acetate, nitroglycerine and methyl alcohol; (3) metal derivatives such as barium nitrate, copper oleate, manganese dioxide, potassium chlorate, and vanadium pentoxide; (4) alkyl nitrates and nitrites such as ethyl nitrate and ethyl nitrite; (5) alkyl and aromatic nitro compounds such as nitroethane, nitrobenzene and nitronaphthalene; (6) oximes and nitroso compounds such as formaldoxime and nitrosomethylmethane; (7) peroxides such as acetone peroxide; (8) polysulfides such as diethyltetrasulfide; and (9) borine trialkyl amines. Unfortunately, many of these prior art materials are relatively ineffective as ignition improvers. However, peroxides and alkyl nitrates are highly effective.

N,N-disubstituted organic nitroxides are organic free radicals which, depending upon structure, have a stability which can vary over a wide range. For example, piperidine-1-oxyl is unstable whereas 2,2,6,6-tetramethylpiperidine-1-oxyl is a stable compound. In general, N,N-disubstituted organic nitroxides having no $\alpha$-hydrogen atoms are stable compounds. The preparation of N,N-disubstituted organic nitroxides is described in the following references: "Free Nitroxyl Radicals" by E. G. Rozantsev, Plenum Press, New York, N.Y., 1970; "Organic Chemistry of Stable Free Radicals," by A. R. Forrester et al., Academic Press, New York, N.Y., 1968; and U.S. Pat. Nos. 3,163,677; 3,334,103 and 3,502,692.

2,2,6,6-Tetramethyl-4-oxopiperidine-1-oxyl and 4-hydroxy-2,2,6,6-tetramethylpiperidine-1-oxyl have been proposed as pour-point depressants for fuels and lubricants in U.S.S.R. Pat. No. 630,284. It is disclosed that these materials can be added to lubricants and fuels in amounts of from 0.04 to 0.2 weight percent for this purpose. However, this patent fails to either suggest or disclose the use of N,N-disubstituted organic nitroxides to improve the cetane number of diesel fuels.

U.S. Pat. Nos. 3,163,677; 3,334,103; 3,502,692 and 3,759,926 disclose that N,N-disubstituted nitroxides are useful as antiknock agents in fuels. These patents do not, however, either suggest or disclose the addition of these nitroxides to diesel fuels. Antiknock agents serve to increase the octane number of a fuel and are believed to function by combining with the reactive intermediates which are produced during hydrocarbon combustion and thereby destroying the ability of these intermediates to propagate further oxidation which leads to knock. Antiknock agents retard combustion whereas, in contrast, cetane improvers serve to promote combustion. Consequently, any increase in the octane number of a hydrocarbon fuel will be reflected by a corresponding decrease in the cetane number of the fuel. Indeed, this relationship can be approximated by the Wilke equation:

$$\text{Cetane Number} = 60 - 0.5(\text{Motor Octane Number})$$

This inverse relationship between cetane number and octane number is discussed, for example, by K. Becker in "The Influence of an Ignition Accelerator on the Ignition Quality and Anti-Knock Properties of Light Hydrocarbons in the Diesel Engine," Society of Automotive Engineers, Paper No. 760163, 1976. As a consequence, the literature teaching that N,N-disubstituted nitroxides are antiknock agents is also a teaching that these materials cannot be used to improve the cetane number of a fuel.

SUMMARY OF THE INVENTION

The present invention is directed to the discovery that N,N-disubstituted organic nitroxides are a highly effective and previously unrecognized class of ignition improvers for diesel fuels.

One embodiment of the invention is a diesel fuel composition comprising a major proportion of a liquid hydrocarbon fuel of diesel fuel boiling range in combination with a minor amount of an N,N-disubstituted organic nitroxide, wherein the amount of said nitroxide is effective to increase the cetane number of said liquid hydrocarbon fuel.

Another embodiment of the invention is a method for increasing the cetane number of a liquid hydrocarbon diesel fuel which comprises mixing said fuel with an N,N-disubstituted organic nitroxide in an amount which is effective to increase said cetane number.

A further embodiment of the invention is a method of operating a compression ignition engine which comprises combusting in said engine a composition which comprises a major proportion of a liquid hydrocarbon fuel in combination with a minor amount of an N,N-disubstituted organic nitroxide which is effective to increase the cetane number of said hydrocarbon fuel.

An object of this invention is to provide a new process for increasing the cetane number of liquid hydrocarbon fuels.

Another object of this invention is to provide an improved diesel fuel composition.

Another object of this invention is to provide a new class of diesel fuel additives for use as ignition accelerators.

A still further object of this invention is to provide a new method for increasing the available pool of diesel fuel.

DETAILED DESCRIPTION OF THE INVENTION

Contrary to the teaching of the prior art, it has been discovered that N,N-disubstituted organic nitroxides are not antiknock agents. Indeed, it has been found that these nitroxides actually serve to decrease the octane of gasoline. Conversely, it has further been discovered that N,N-disubstituted organic nitroxides are extremely active ignition accelerators for hydrocarbon fuels and are useful as cetane improvers for diesel fuels.

Suitable nitroxides for use in the practice of this invention include any N,N-disubstituted organic nitroxide. However, it is preferred that each substituent contain a tertiary carbon atom which is bonded to the nitroxide nitrogen. These preferred materials have no α-hydrogen atoms and, as a consequence, are quite stable since disproportionation to a hydroxylamine cannot take place. Highly preferred nitroxides for use in the practice of this invention have the general formula:

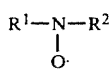

wherein $R^1$ and $R^2$ are independently selected from the group consisting of aryl and substituted aryl of from 6 to 10 carbon atoms and $CR^3R^4R^5$ wherein $R^3$, $R^4$ and $R^5$ each contain from 1 to 15 carbon atoms and are independently selected from the group consisting of hydrocarbyl, aminohydrocarbyl, alkoxyhydrocarbyl, carboxyhydrocarbyl, carboalkoxyhydrocarbyl, and cyanohydrocarbyl with the proviso that $R^1$ and $R^2$ can be joined to form a 5- or 6-membered ring. Most preferably, $R^1$ and $R^2$ are independently selected from the group consisting of tertiary alkyl and tertiary aminoalkyl of from 4 to 10 carbon atoms with the proviso that $R^1$ and $R^2$ can be joined to form a 5- or 6-membered ring. Di-tert-butylnitroxide is a particularly preferred material in view of its stability and very high activity as a cetane improver.

As used herein, hydrocarbyl is a monovalent organic group composed of hydrogen and carbon and can be aliphatic, aromatic, alicyclic or combinations thereof, and includes, but is not limited to, alkyl, cycloalkyl, cycloalkylalkyl, aralkyl, alkenyl, and alkynyl.

The N,N-disubstituted organic nitroxides of this invention can be used in combination with any liquid hydrocarbon fuel in the diesel fuel boiling range. Suitable hydrocarbon fuels include but are not limited to heavy naphtha, light gas oil, heavy gas oil, cracked gas oil, No. 2 burner fuels, light residual stocks, and distillate fuels derived from the liquefaction of coal and the processing of tar sands and oil shale together with blends of the various foregoing materials. Suitable hydrocarbon fuels usually boil within a range from about 150° C. to about 400° C. It will be appreciated, of course, that the initial and final boiling points of a suitable diesel fuel can vary to some extent from these values depending upon the grade of the fuel, its source, and its method of manufacture and formulation. Through the use of the nitroxide ignition improvers of this invention, increased amounts of low cetane number distillate fuels can be added to the usable pool of diesel fuel. For example, this invention provides a new method for the increased use of low cetane number cracked gas oil as a blending component in the diesel fuel pool.

In the practice of this invention, conventional additives can also be combined with the hydrocarbon fuel in addition to the subject nitroxide ignition improvers. These conventional additives include but are not limited to stabilizers, corrosion inhibitors, dyes and the like.

The N,N-disubstituted organic nitroxide ignition improvers of this invention are employed in a minor amount which is effective to increase the cetane number of the fuel with which it is used. The amount of nitroxide which is required for this purpose will ordinarily be in the range from about 0.01 to about 5 weight percent based on the total weight of the resulting fuel. However, the amount of nitroxide is preferably from about 0.1 to about 3 weight percent and will frequently be from about 0.3 to about 2 weight percent based on the combined weight of hydrocarbon fuel and nitroxide additive. In order to insure proper ignition in a compression ignition or diesel engine, it is desirable that the combination of hydrocarbon fuel and nitroxide cetane improver have a cetane number of at least about 40. However, a cetane number greater than about 65 is generally unnecessary.

N,N-disubstituted organic nitroxides are known to be active as inhibitors of polymerization and autoxidation. This capability is apparently the result of an ability to capture chain propagating free radicals by way of a simple radical-radical combination reaction to yield stable products. On the basis of this activity, it is surprising that N,N-disubstituted organic nitroxides can function as highly active ignition promoters in accordance with the present invention. That is to say, the low temperature behavior of these nitroxides does not appear to properly reflect their behavior at elevated temperatures and in the gas phase within a compression ignition engine. Although the present invention is not to be so limited, it is possible that the nitroxides are efficient radical scavengers and that the products of initial oxidation inhibition then become efficient ignition promoters. Alternatively, it is possible that thermal decomposition of the nitroxides takes place within the engine to yield products which promote combustion.

The following examples are intended only to illustrate the invention and are not to be construed as imposing limitations on the invention.

EXAMPLE I

The effect of including minor amounts of the N,N-disubstituted organic nitroxides of this invention on the octane number of gasoline is illustrated by the results which are set forth in Table I. Small amounts of 2,2,6,6-tetramethylpiperidine-1-oxyl and di-tert-butylnitroxide were blended with two different gasolines, and the octane of each blend was compared with that of the base fuel. The research octane number (RON) and motor octane number (MON) of the various fuel compositions were determined in accordance with American Society for Testing and Materials tests ASTM D-2699 and ASTM D-2700 respectively. In the absence of any nitroxide additive, gasoline A had a research octane number of 91.7 and a motor octane number of 81.9, and gasoline B had a research octane number of 99.0 and a motor octane number of 87.0.

The results in Table I demonstrate that the effect of 2,2,6,6-tetramethylpiperidine-1-oxyl and di-tert-butylnitroxide on gasoline is to lower the octane number. This is contrary to the teaching of the prior art as set forth in U.S. Pat. Nos. 3,163,677; 3,334,103; 3,502,692 and 3,759,926.

TABLE I

| Additive | Gasoline | Additive Amount, Wt. % | Change in Octane No. RON | Change in Octane No. MON |
|---|---|---|---|---|
| 2,2,6,6-Tetramethyl-piperidine-1-oxyl | A | 0.4 | −0.9 | −1.6 |
| 2,2,6,6-Tetramethyl-piperidine-1-oxyl | B | 0.4 | −2.9 | −2.3 |
| Di-tert-butylnitroxide | A | 0.4 | −7.1 | −6.1 |
| Di-tert-butylnitroxide | B | 0.4 | −3.8 | — |
| Di-tert-butylnitroxide | A | 0.1 | −2.9 | −2.4 |
| Di-tert-butylnitroxide | B | 0.1 | −2.1 | −1.5 |

EXAMPLE II

The effect of including minor amounts of the N,N-disubstituted organic nitroxides of this invention in diesel fuel is shown in Table II. Small amounts of 2,2,6,6-tetramethylpiperidine-1-oxyl; 4-amino-2,2,6,6-tetramethylpiperidine-1-oxyl and di-tert-butylnitroxide were blended with three different diesel fuels, and the cetane number of each blend was compared with that of the additive free base fuel. Fuel C was a No. 2 diesel fuel, Fuel D was a light catalytic cycle oil, and Fuel E was a virgin gas oil. The effect of hexyl nitrate on two of the fuels was similarly determined for comparison purposes. The cetane number of each composition was determined in accordance with American Society for Testing and Materials test ASTM D-613.

TABLE II

| Additive | Fuel | Additive Amount, Wt. % | Cetane No. | Change in Cetane No. |
|---|---|---|---|---|
| None | C | — | 45.3 | — |
| 2,2,6,6-Tetramethyl-piperidine-1-oxyl | C | 0.5 | 46.4 | +1.1 |
| 4-Amino-2,2,6,6-tetramethylpiperidine-1-oxyl | C | 0.5 | 46.2 | +0.9 |
| Di-tert-butylnitroxide | C | 0.5 | 56.4 | +11.1 |
| None | D | — | 30.0 | — |
| None | E | — | 55.8 | — |
| Di-tert-butylnitroxide | D | 0.3 | 35.1 | +5.1 |
| Di-tert-butylnitroxide | E | 0.3 | 64.0 | +8.2 |
| Di-tert-butylnitroxide | E | 0.15 | 59.7 | +3.9 |
| Hexyl nitrate | D | 0.3 | 35.6 | +5.6 |
| Hexyl nitrate | E | 0.3 | 67.6 | +11.8 |

The results in Table II demonstrate that a minor amount of each nitroxide is effective to increase the cetane number of a diesel fuel. In addition, the results also show that di-tert-butyl-nitroxide is particularly effective as a cetane improver. Comparison of the results for di-tert-butylnitroxide with those for hexyl nitrate in Table II demonstrate that di-tert-butylnitroxide has about the same level of activity as hexyl nitrate which is used commercially as a cetane improver. The results also show that a fuel of high cetane number is more responsive to additions of di-tert-butylnitroxide than one of low cetane number.

I claim:

1. A diesel fuel composition comprising a liquid hydrocarbon fuel of diesel fuel boiling range in combination with an N,N-disubstituted organic nitroxide wherein the amount of said nitroxide is from about 0.3 to about 2 weight percent of said composition.

2. A diesel fuel composition comprising a major proportion of a liquid hydrocarbon fuel of diesel fuel boiling range in combination with a minor amount of an N,N-disubstituted organic nitroxide of the formula:

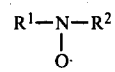

wherein $R^1$ and $R^2$ are independently selected from the group consisting of aryl and substituted aryl of from 6 to 10 carbon atoms and $CR^3R^4R^5$ wherein $R^3$, $R^4$ and $R^5$ each contain from 1 to 15 carbon atoms and are independently selected from the group consisting of hydrocarbyl, aminohydrocarbyl, alkoxyhydrocarbyl, carboxyhydrocarbyl, carboalkoxyhydrocarbyl and cyanohydrocarbyl with the proviso that $R^1$ and $R^2$ can be joined to form a 5- or 6-membered ring, and wherein the amount of said nitroxide is effective to increase the cetane number of said liquid hydrocarbon fuel.

3. A composition as set forth in claim 2 wherein $R^1$ and $R^2$ are independently selected from the group consisting of tertiary alkyl and tertiary aminoalkyl of from 4 to 10 carbon atoms with the proviso that $R^1$ and $R^2$ can be joined to form a 5- or 6-membered ring.

4. A composition as set forth in claim 3 wherein the amount of said nitroxide is from about 0.01 to about 5 percent by weight of said composition.

5. A composition as set forth in claim 4 wherein said nitroxide is di-tert-butylnitroxide.

6. A composition as set forth in claim 4 wherein said nitroxide is 2,2,6,6-tetramethylpiperidine-1-oxyl.

7. A composition as set forth in claim 4 wherein said nitroxide is 4-amino-2,2,6,6-tetramethylpiperidine-1-oxyl.

8. A method for increasing the cetane number of a liquid hydrocarbon diesel fuel which comprises mixing said fuel with an N,N-disubstituted organic nitroxide of the formula:

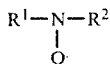

wherein $R^1$ and $R^2$ are independently selected from the group consisting of aryl and substituted aryl of from 6 to 10 carbon atoms and $CR^3R^4R^5$ wherein $R^3$, $R^4$ and $R^5$ each contain from 1 to 15 carbon atoms and are independently selected from the group consisting of hydrocarbyl, aminohydrocarbyl, alkoxyhydrocarbyl, carboxyhydrocarbyl, carboalkoxyhydrocarbyl and cyanohydrocarbyl with the proviso that $R^1$ and $R^2$ can be joined to form a 5- or 6-membered ring, and wherein the amount of said nitroxide is effective to increase said cetane number.

9. A method as set forth in claim 8 wherein $R^1$ and $R^2$ are independently selected from the group consisting of tertiary alkyl and tertiary aminoalkyl of from 4 to 10 carbon atoms with the proviso that $R^1$ and $R^2$ can be joined to form a 5- or 6-membered ring.

10. A method as set forth in claim 9 wherein the amount of said nitroxide is from about 0.01 to about 5 percent by weight of said mixture.

11. A method as set forth in claim 10 wherein said nitroxide is di-tert-butylnitroxide.

12. A method as set forth in claim 10 wherein said nitroxide is 2,2,6,6-tetramethylpiperidine-1-oxyl.

13. A method as set forth in claim 10 wherein said nitroxide is 4-amino-2,2,6,6-tetramethylpiperidine-1-oxyl.

14. A method of operating a compression ignition engine which comprises combusting in said engine a composition which comprises a liquid hydrocarbon fuel in combination with an N,N-disubstituted organic nitroxide wherein the amount of said nitroxide is from about 0.3 to about 2 weight percent of said composition.

15. A method of operating a compression ignition engine which comprises combusting in said engine a composition which comprises a major proportion of a liquid hydrocarbon fuel in combination with a minor amount of an N,N-disubstituted organic nitroxide of the formula:

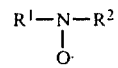

wherein $R^1$ and $R^2$ are independently selected from the group consisting of aryl and substituted aryl of from 6 to 10 carbon atoms and $CR^3R^4R^5$ wherein $R^3$, $R^4$ and $R^5$ each contain from 1 to 15 carbon atoms and are independently selected from the group consisting of hydrocarbyl, aminohydrocarbyl, alkoxyhydrocarbyl, carboxyhydrocarbyl, carboalkoxyhydrocarbyl and cyanohydrocarbyl with the proviso that $R^1$ and $R^2$ can be joined to form a 5- or 6-membered ring, and wherein the amount of said nitroxide is effective to increase the cetane number of said liquid hydrocarbon fuel.

16. A method as set forth in claim 15 wherein $R^1$ and $R^2$ are independently selected from the group consisting of tertiary alkyl and tertiary aminoalkyl of from 4 to 10 carbon atoms with the proviso that $R^1$ and $R^2$ can be joined to form a 5- or 6-membered ring.

17. A method as set forth in claim 16 wherein the amount of said nitroxide is from about 0.01 to about 5 percent by weight of said composition.

18. A method as set forth in claim 17 wherein said nitroxide is di-tert-butylnitroxide.

19. A method as set forth in claim 17 wherein said nitroxide is 2,2,6,6-tetramethylpiperidine-1-oxyl.

20. A method as set forth in claim 17 wherein said nitroxide is 4-amino-2,2,6,6-tetramethylpiperidine-1-oxyl.

* * * * *